US010440902B2

(12) United States Patent
Romas et al.

(10) Patent No.: US 10,440,902 B2
(45) Date of Patent: *Oct. 15, 2019

(54) ANIMAL INCURSION-RESISTANT RAISED BED GARDENING SYSTEM

(71) Applicant: W. Atlee Burpee Company, Warminster, PA (US)

(72) Inventors: Chris G. Romas, Jamison, PA (US); John J. Sikina, Hatboro, PA (US)

(73) Assignee: W. Atlee Burpee Company, Warminster, PA (US)

(*) Notice: Subject to any disclaimer, the term of this patent is extended or adjusted under 35 U.S.C. 154(b) by 8 days.

This patent is subject to a terminal disclaimer.

(21) Appl. No.: 15/234,318

(22) Filed: Aug. 11, 2016

(65) Prior Publication Data

US 2016/0345514 A1 Dec. 1, 2016

Related U.S. Application Data

(63) Continuation of application No. 14/511,803, filed on Oct. 10, 2014, now Pat. No. 9,433,155.

(51) Int. Cl.
*A01G 13/00* (2006.01)
*A01G 13/10* (2006.01)
(Continued)

(52) U.S. Cl.
CPC ............... *A01G 13/10* (2013.01); *A01G 9/00* (2013.01); *A01G 9/02* (2013.01); *A01G 9/28* (2018.02)

(58) Field of Classification Search
CPC ...... A01G 13/10; A01G 13/02; A47D 13/065; A01K 3/00
(Continued)

(56) References Cited

U.S. PATENT DOCUMENTS

| 794,933 A | * | 7/1905 | Gay | ........................ E04H 17/18 256/26 |
| 2,581,318 A | * | 1/1952 | Bartlett | .................... A01K 3/00 119/514 |

(Continued)

FOREIGN PATENT DOCUMENTS

| EP | 2273040 B1 | 5/2012 |
| EP | 2428941 B1 | 6/2013 |

*Primary Examiner* — Kristen C Hayes
(74) *Attorney, Agent, or Firm* — Caesar Rivise, PC (57) ABSTRACT

Disclosed is a system having a base and a screened enclosure for disposition on the ground for growing plants. The base forms a hollow enclosure into which a growing medium can be disposed. The screened enclosure is mounted on the base and is in the form of a plurality of elongated frame members, plural upper screen members and plural lower screen members. Each of the screen members has an opposed pair of side edges, a top edge and a bottom edge. The frame members extend upward from the base and are spaced apart from one another. Each of the frame members includes a first respective section arranged to slidably receive a respective side of a respective lower screen member therein and a second respective section arranged to slidably receive a respective side of a respective upper screen member therein. Each of the upper and lower screen members are arranged to be individually removed from their respective sections of their associated frame members to enable each of the screen members to be individually removed from the frame members.

12 Claims, 4 Drawing Sheets

(51) Int. Cl.
*A01G 9/02* (2018.01)
*A01G 9/00* (2018.01)
*A01G 9/28* (2018.01)

(58) Field of Classification Search
USPC .............................................................. 47/30
See application file for complete search history.

(56) References Cited

U.S. PATENT DOCUMENTS

| | | | | |
|---|---|---|---|---|
| 3,745,729 A * | 7/1973 | Vaughn | ................... | E01C 13/04 |
| | | | | 472/94 |
| 3,767,167 A | 10/1973 | Rasmussen | | |
| 5,322,793 A * | 6/1994 | Yarnell | ............... | C05F 17/0205 |
| | | | | 435/290.1 |
| 5,599,006 A * | 2/1997 | Gevaux | ................ | E01F 13/022 |
| | | | | 160/351 |
| 6,311,428 B1 | 11/2001 | Marino et al. | | |
| 7,293,530 B2 * | 11/2007 | Italiano | ................... | A01K 1/03 |
| | | | | 119/453 |
| 7,424,787 B2 | 9/2008 | Singer | | |
| 7,490,435 B2 * | 2/2009 | Singer | ...................... | A01G 9/20 |
| | | | | 47/19.1 |
| 7,533,488 B2 | 5/2009 | Singer | | |
| 7,676,987 B2 * | 3/2010 | Yoshida | .................... | A01G 9/02 |
| | | | | 47/1.01 F |
| 8,308,141 B1 | 11/2012 | Mellins et al. | | |
| RE44,055 E | 3/2013 | Singer et al. | | |
| 9,215,860 B2 * | 12/2015 | Hsieh | ..................... | A01K 1/034 |
| 2004/0140461 A1 * | 7/2004 | Lappen | ................... | E04H 17/16 |
| | | | | 256/24 |
| 2005/0087733 A1 * | 4/2005 | Weitzel | ................. | E04H 17/161 |
| | | | | 256/59 |
| 2006/0038165 A1 | 2/2006 | Larsen | | |
| 2007/0130824 A1 | 6/2007 | Teich | | |
| 2007/0151150 A1 | 7/2007 | Sandoval | | |
| 2010/0224848 A1 * | 9/2010 | Singer | ................... | A01M 29/30 |
| | | | | 256/25 |
| 2011/0252702 A1 | 10/2011 | Gazjuk | | |
| 2011/0283611 A1 | 11/2011 | Topping | | |
| 2013/0074401 A1 | 3/2013 | Forno | | |
| 2013/0174480 A1 | 7/2013 | Gabelmann | | |

\* cited by examiner

Fig. 8

ANIMAL INCURSION-RESISTANT RAISED BED GARDENING SYSTEM

CROSS-REFERENCE TO RELATED APPLICATIONS

This application is a continuation of application Ser. No. 14/511,803, filed on Oct. 10, 2014, entitled ANIMAL-INCURSION-RESISTANT RAISED BED GARDENING SYSTEM, the entire disclosure of which application is specifically incorporated by reference herein.

BACKGROUND OF THE INVENTION

This invention relates to gardening systems and more particularly to raised bed gardening systems including means to protect the plants from animals.

Raised garden beds are becoming more and more popular both in commercial agriculture and in home agricultural settings inasmuch as they provide numerous advantages over normal-grade garden beds. For example, raised beds permit precise control of soil conditions while offering better water drainage and less soil compaction. The use of raised beds has led to the development of numerous types of containment systems to hold the soil and keep unwanted pests or animals out of the garden. Moreover such systems also include various means for enabling access to the raised bed.

The patent literature includes a number of patents directed to raised bed systems. For example see, U.S. Pat. No. 7,424,787 (Singer); U.S. Pat. No. 7,490,435 (Singer); RE44,055 (Singer); United States Published Applications US2007/0130824 (Teich); US2010/0224848 (Singer et al.); US2011/0252702 (Gazjuk); US 2011/0283611 (Topping); US2013/0174480 (Gabelmann); and European Published Application EP2273040 (Vandermaessen).

While those prior art raised bed systems including enclosures for keeping out animals or pests are generally suitable for their purposes they nevertheless leave something to be desired from the standpoints of simplicity of construction, ease of use and effectiveness. Accordingly, a need exists for a raised bed system which achieves those ends. The subject invention does so.

All references cited and/or identified herein are specifically incorporated by reference herein.

SUMMARY OF THE INVENTION

One aspect of this invention entails a system for disposition on the ground for growing plants. The system basically comprises a base and a screened enclosure. The base is arranged to be disposed on the ground and has a plurality of interconnected sections forming a hollow enclosure into which a growing medium can be disposed. The screened enclosure is mounted on the base encircling the hollow enclosure. The screened enclosure comprises a plurality of elongated frame members, at least one upper screen member and at least one lower screen member. Each of the screen members has an opposed pair of side edges, a top edge and a bottom edge. The plurality of elongated frame members are connected to the base and extend upward therefrom. A first one of the frame members and a second one of the frame members define a gap therebetween. Each of the first and second frame members comprises a respective section arranged to receive a respective side of the lower screen member, wherein the bottom edge of the lower screen member can be placed in a position immediately adjacent the base. Each of the first and second frame members additionally comprise a section arranged to receive a respective side of the upper screen member therein, wherein the bottom edge of the upper screen member can be placed in a position immediately adjacent the top edge of the lower screen member. Each of the upper and lower screen members are also arranged to be individually removed from its respective section of its associated frame members to enable each of the screen members to be individually removed from the frame members.

In accordance with one preferred aspect of this invention each of the first and second frame members comprises a first track section arranged to slidably receive a respective side of the lower screen member therein wherein the bottom edge of the lower screen member can be slid to a position immediately adjacent the base, and wherein each of the first and second frame members additionally comprises a second track section arranged to slidably receive a respective side of the upper screen member therein wherein the bottom edge of the upper screen member can be slid to a position immediately adjacent the top edge of the lower screen frame. The lower screen member is arranged to be individually slid out of the first track section of the first and second track members to enable the lower screen member to be individually removed from the screened enclosure. The upper screen member is arranged to be individually slid out of the second track section of the first and second track members to enable the upper screen member to be individually removed from the screened enclosure.

In accordance with another preferred aspect of this invention the screened enclosure comprises plural upper screen members and plural lower screen members, and wherein respective ones of the plural upper screen members and respective ones of the plural lower screen members are slidably disposed between adjacent frame members, with the bottom edge of each of the lower screen members being disposed immediately adjacent respective portions of the base, and with the bottom edge of each of the upper screen members being disposed immediately adjacent the top edge of a respective one of the lower screen members.

DETAILED DESCRIPTION OF THE PREFERRED EMBODIMENT

Figure 1:
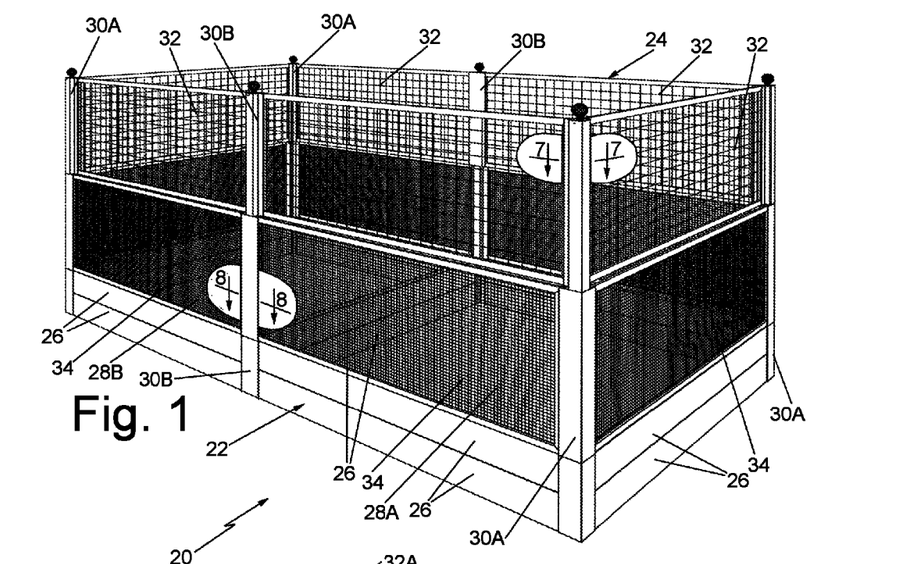
FIG. 1 is a perspective view of one exemplary embodiment of an animal incursion resistant raised bed gardening system constructed in accordance with this invention.

Referring now to the various figures of the drawing wherein like reference characters refer to like parts, there is shown at 20 in FIG. 1 one exemplary embodiment of a raised bed gardening system constructed in accordance with this invention.

The system 20 basically comprises a base 22 and a screened enclosure 24. The base 22 is an assembly of plural planks or beams 26 which are interconnected, as will be described later, to form at least one hollow enclosure that is arranged to be disposed on the ground. In the exemplary embodiment shown in FIG. 1, the system includes two such hollow enclosures 28A and 28B. The interior of each hollow enclosure formed by the planks 26 of the base serve to receive a growing medium, e.g., soil, nutrients, etc. to form a raised bed or garden for growing one or more plants or vegetables therein. The material making up the planks or beams of the base can be any suitable materials which can hold up to typical soil conditions. In accordance with a preferred embodiment of this invention the planks or beams are wood or composite wood.

The screened enclosure 24 is mounted on the base 22 encircling the beds 28A and 28B and includes a series of protective screens that help gardeners keep what they sow in the bed(s), safe from ravaging by large or small animals. To that end the screened enclosure 24 basically comprises a plurality of elongated post or frame members 30, plural upper screen members 32 and plural lower screen members 34. As will be described later the upper screen members are designed to keep large animals, such as deer, out of the garden, while the lower screen members are designed to keep small animals, such as rabbits and ground hogs out of the garden. The post or frame members 30 serve to slidably support the screen members in such a manner than any particular screen member can be individually raised, lowered or entirely removed from the enclosure. This feature provides the gardener with complete and easy access to the contents, e.g., the plants/vegetables, growing in the raised bed(s).

In accordance with one preferred embodiment of this invention the upper screens are located at the top portion of the screened enclosure 24 and are in the form of a relatively large mesh or grid to keep large animals from gaining access to the bed(s) when the screens are in their normal (lowered) position. The lower screens are located at the bottom portion of the screened enclosure 24, e.g., adjacent the base 22, and are in the form of a relatively small mesh or grid to keep small animals from gaining access to the bed(s) when the lower screens are in their normal (lowered) position.

Figures 2, 3:
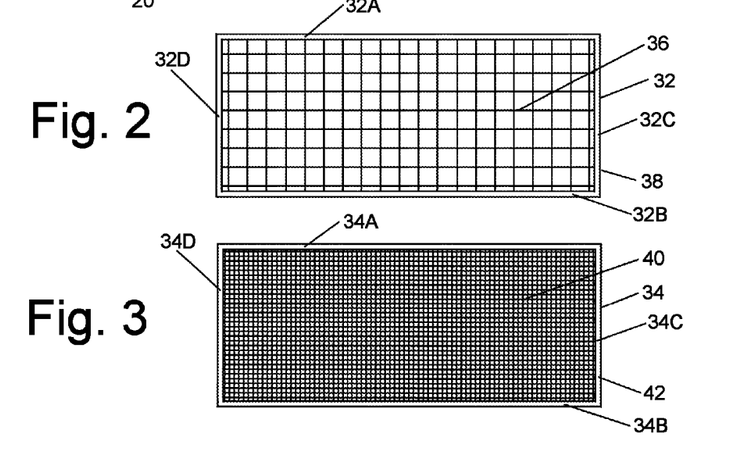
FIG. 2 is a plan view of an exemplary large grid, upper screen member forming a portion of the system shown in FIG. 1.
FIG. 3 is a plan view, similar to FIG. 2, but showing an exemplary small grid, lower screen member forming a portion of the system shown in FIG. 1.
Figure 7:
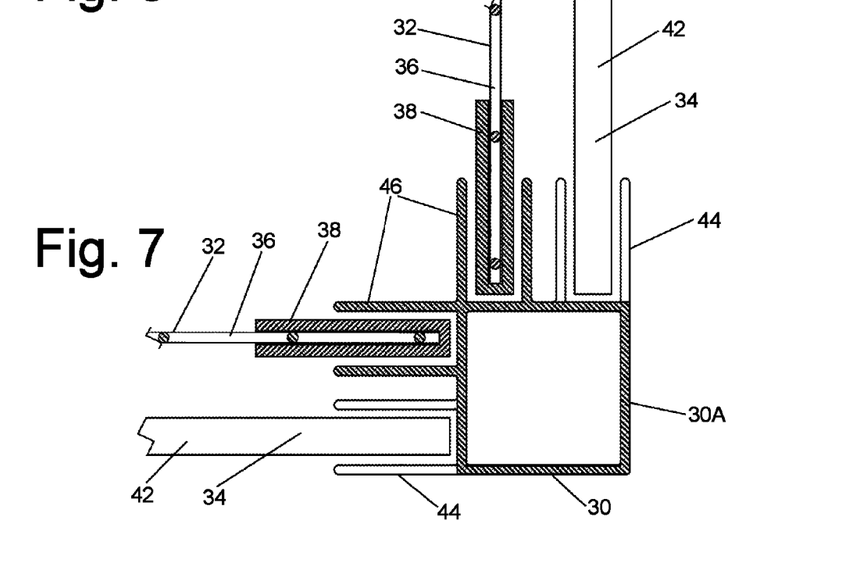
FIG. 7 is an enlarged sectional view taken along line 7-7 of FIG. 1, showing the construction of a corner frame member for slidably supporting a pair of large grid, upper screen members and for slidably supporting a pair of small grid, lower screen members at a corner of the system of FIG. 1.
Figure 8:
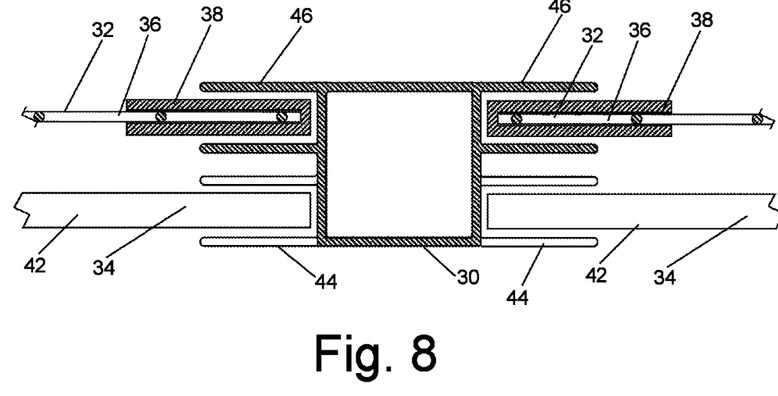
FIG. 8 is an enlarged sectional view taken along line 8-8 of FIG. 1, showing the construction of a center frame member for slidably supporting a pair of large grid, upper screen members and for slidably supporting a pair of small grid, lower screen members at the center of the front of the system of FIG. 1.

Turning now to FIGS. 2, 7 and 8 the details of the upper screen members 32 will now be described. Each upper screen member comprises a wire mesh or grid panel 36 and a peripheral frame 38. The panel 36 in the exemplary embodiment shown is rectangular, but that shape is merely exemplary. Thus, the panel 36 can be of any shape desired, e.g., square, etc. The resulting upper screen member has a top edge 32A, a bottom edge 32B, and a pair of opposed side edges 32C and 32D. As best seen in FIGS. 7 and 8 the frame 38 is generally U-shaped in cross section so that it can receive the peripheral edge of the mesh panel 36. The mesh panel 36, as noted above, of a relatively large, e.g., 2" square, mesh or grid and can be formed of any suitable material, e.g., welded steel galvanized wire. The frame 38 can also be formed of any suitable material. In an exemplary preferred embodiment it is formed of aluminum.

The lower screen members 34 are similar in construction to the upper screen members 32. To that end, as best seen in FIG. 3 each lower screen member 34 comprises a wire mesh or grid panel 40 and a peripheral frame 42. The panel 40 in the exemplary embodiment shown is rectangular, but that shape is merely exemplary. Thus, the panel 40 can be of any shape desired, e.g., square, providing that its width is the same as the width of the upper screen member since any particular upper screen member and its associated lower screen member are slidably supported between a pair of adjacent post or frame members 30, as will be described in detail later.

Each lower screen member has a top edge 34A, a bottom edge 34B, and a pair of opposed side edges 34C and 34D. While not shown, the frame 42 is generally U-shaped in cross section, like frame 36, so that it can receive the peripheral edge of the mesh panel 40. The mesh panel 40, as noted above, of a relatively small, e.g., 0.5 inch square, mesh or grid and can be formed of any suitable material, e.g., woven aluminum wire. The frame 42 can also be formed of any suitable material. In an exemplary preferred embodiment it is formed of aluminum.

Even though the lower screen members are of a mesh whose size is smaller than that of the upper screen members, it is nevertheless of sufficient size to allow sufficient sunlight to pass therethrough to encourage plant growth performance in the bed.

Figure 5:
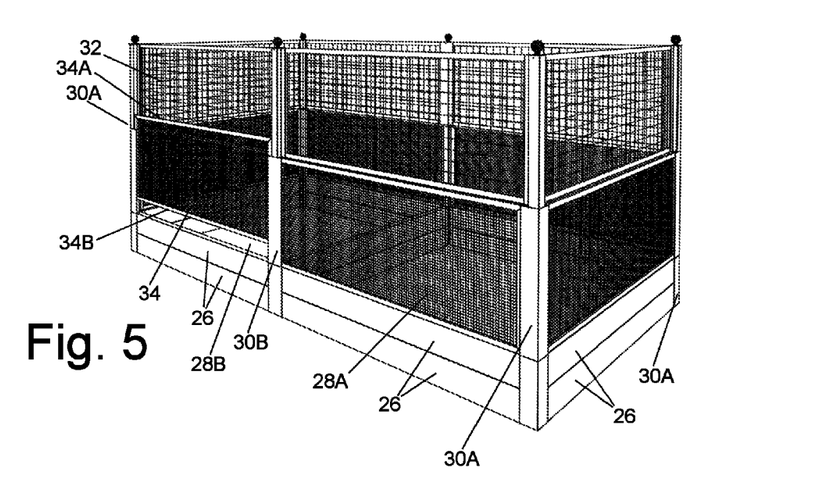
FIG. 5 is reduced perspective view of the exemplary embodiment of the system shown in FIG. 1, with one of the lower, small grid screen members being shown in a slightly raised or elevated position.

As can be seen in FIGS. 1 and 5, and as mentioned above, the post or frame members 30 are spaced from each other and extend upward around the periphery of the base 22. The spacing or gap between adjacent post or frame members is selected to be just slightly larger than the width of the upper and lower screen members 32 and 34, respectively. The post or frame members are of two types, namely, a corner post or frame member 30A and a side post or frame member 30B. Each corner frame member 30A is located at a respective corner of the enclosure 24 to releasably slidably support the respective side edges of the upper and lower screen members at that corner. Each side frame member 30B is located on a respective side of the enclosure 24 between two corner frame members 30A to releasably slidably the respective side edges of the upper and lower screen members on each side of the side frame member.

Turning now to FIG. 7, the details of a typical corner post or frame member 30A will now be described. To that end, as can be seen each corner post or frame member 30A is an elongated member that is formed of any suitable material, e.g., extruded aluminum. Each corner frame member 30A is of square cross section and includes a pair of first elongated, linear channels or track sections 44 projecting outward from respective inside surfaces of the frame member 30A so that the track sections 44 are oriented perpendicularly to each other towards the adjacent bed. The other two surfaces of each corner frame member constitute an outside surface and are directed away from the bed.

Figure 4:
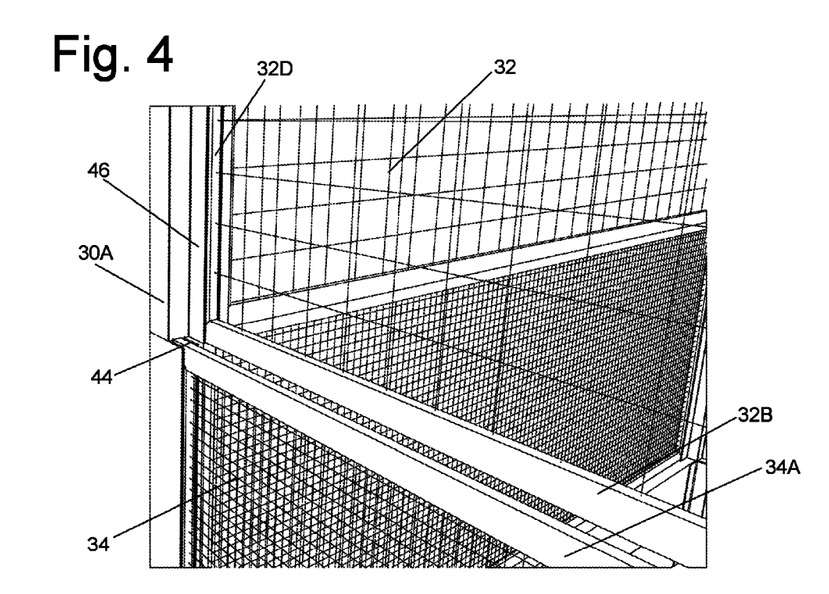
FIG. 4 is an enlarged perspective view of a portion of the system shown in FIG. 1.
Figure 6:
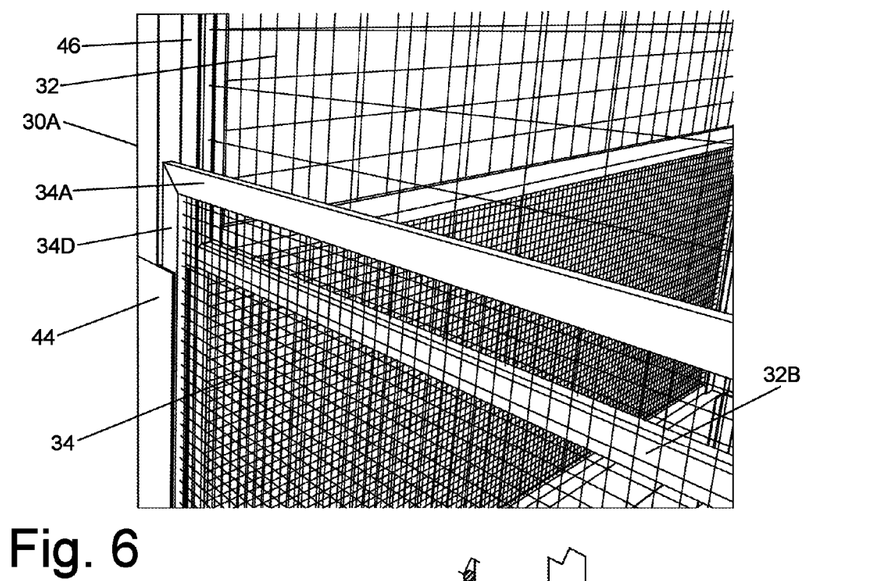
FIG. 6 is an enlarged perspective view of a portion of the system shown in FIG. 5.

As best seen in FIGS. 4 and 6, the track sections 44 are located at the bottom portion of each corner frame member and are arranged to releasably slidably receive respective sides of the frame 42 of the lower screen members 34 at that corner. Thus, the bottom edge 34B of the frames of those lower screen members 34 can be slid to a position immediately adjacent the base 22 like shown in FIG. 1. Each of the corner frame members 30A also includes a pair of second elongated, linear channels or track sections 46 projecting outward from respective surfaces of the frame member 30A so that the track sections 46 are oriented perpendicularly to each other. The track sections 46 are located at the top portion of each corner frame member and are set-back from the position of the track sections 44, i.e., are closer to the bed than the track sections 44. In accordance with one preferred exemplary embodiment of this invention, the track sections 46 are set back approximately 1 inch from the track sections 44. The track sections 46 are arranged to releasably slidably receive respective sides of the frames 38 of the upper screen members 32 at that corner. Thus, the bottom edge 32B of the frames 38 of the upper screen members 32 can be slid to a position immediately adjacent the top edge 34A of the frame of the underlying lower screen member.

Turning now to FIG. 8, the details of a typical side post or frame member 30B will now be described. To that end, as can be seen each side post or frame member 30B is an elongated member that is formed of any suitable material, e.g., extruded aluminum. Each side frame member 30B is of square cross section and includes a pair of first elongated, linear channels or track sections 44 projecting outward from respective opposed surfaces of the frame member 30B so that the track sections 44 are oriented 180 degrees to each other. The track sections 44 are located at the bottom portion of each side frame member and are arranged to releasably slidably receive respective sides of the frame 42 of the lower screen members 34 on either side thereof. Thus, the bottom edge 34B of the frames of those lower screen members 34 can be slid to a position immediately adjacent the base 22 like shown in FIG. 1. Each of the side frame members 30B also includes a pair of second elongated, linear channels or track sections 46 projecting outward from respective surfaces of the frame member 30A so that the track sections 46 are oriented 180 degrees to each other. The track sections 46 are located at the top portion of each side frame member and are set-back from the position of the track sections 44, i.e., the track sections 46 are located closer to the bed than the track sections 44. In accordance with one preferred exemplary embodiment of this invention, the track sections 46 of the side post or frame members 30B are set back approximately 1 inch from the track sections 44. The track sections 46 are arranged to releasably slidably receive respective sides of the frames 38 of the upper screen members 32 on either side thereof. Thus, the bottom edge 32B of the frames 38 of the upper screen members 32 can be slid to a position immediately adjacent the top edge 34A of the frame of the underlying lower screen member, like shown in FIG. 1.

Each of the track sections 44 and 46 is open at the top end thereof. Thus, any lower screen member 34 which is located in the track sections 44 of adjacent frame members 30 can be slid upward, like shown in FIGS. 5 and 6, to any position with respect to its frame members to provide the user with access to the bed within the enclosure 24. In fact, since the top of each track section 44 is open each lower screen member located therein can be slid upward beyond the top end of the track section to completely remove the lower screen member from the enclosure 24. In a similar manner, any upper screen member 32 which is located in the track sections 46 of adjacent frame members 30 can be slid upward to any position with respect to its frame members to provide the user with access to the bed within the enclosure 24. Also, since the top of each track section 46 is open each upper screen member located therein can be slid upward beyond the top end of the track section 46 to completely remove the upper screen member from the enclosure 24.

While not shown, the track sections 46 include a stop at the bottom thereof to prevent the upper screen members from sliding out of the bottom of those track sections. In accordance with a preferred embodiment of this invention each stop is preferably in the form of a pop-rivet located approximately 0.25 inch from the bottom of the associated track section. However, other forms of stops, e.g., a ledge, a wall, etc., can be used in lieu of a pop-rivet.

As should be appreciated by those skilled in the art, by having the tracks 46 holding the upper screen members off-set, e.g., set back, from the tracks 44, the gardener can readily grasp the particular screen member desired to be moved or removed. This enables the gardener to lift or otherwise remove any lower (small animal) screen member 34 to work in the garden through opening provided by the lifted or removed lower screen member, without needing to remove the upper (large animal) screen member located immediately above it.

While not shown, each corner post or frame member 30A includes two pair of projecting walls or flanges. Each pair of walls or flanges is located at the bottom-most portion of the corner post or frame member 30A on the surfaces from which the track sections 44 and 46 project. The walls or flanges of pair are spaced apart by a distance just slightly larger than the thickness of the planks or beams 26, to enable a respective end of a plank or beam to be received therein to form the base. Each side post or frame member 30B includes three pair of projecting walls or flanges which are located at the bottom-most portion thereof. The walls or flanges of two of the pairs project inward from the respective surfaces of the post or frame member 30B from which the track sections 44 and 46 project. In addition, a third of the three pairs of walls or flanges projects inward from the inner surface of the side post or frame member 30B. The walls or flanges of each pair are also spaced apart by a distance just slightly larger than the thickness of the planks or beams 26, to enable a respective end of a plank or beam to be received therein. Thus, the walls or flanges projecting inward from the inner surface of the side post or frame member 30B receive a respective end of a plank or bean to divide the base 22 into the two beds 28A and 28B.

It should be pointed out at this juncture that the height of the walls or flanges of each corner and side post or frame member is sufficient to accommodate two or more planks or beams that are stacked up as shown in FIGS. 1 and 5 to produce a raised bed whose height is a multiple of the height of any of the planks or beams.

While not shown a wire mesh is also preferably disposed under the beds 28A and 28B to protect against the incursion of burrowing animals.

It should be pointed out at this juncture, that various changes can be made to the system of this invention. For example, the post or frame members 30 need not be of square cross section, e.g., they can be of round cross section. Moreover, the corner members need not be arranged so that the upper and lower track sections are perpendicular to each other. Thus, they can be at an obtuse or acute angle to each other, so that the resulting enclosure is not rectangular or square shaped. Moreover, the track sections holding the lower screen members may be set back from the track sections holding the upper screen members. Further still, the system may be configured to provide only a single bed instead of the two beds shown in FIG. 1. In fact the system may be configured to create any number of beds. Further still, the screened enclosure may be constructed so that there is only one upper and one lower screen member, with both screen members being individually slidable to any desired position and also individually removable. In fact, the subject invention contemplates a raised bed system in which the upper and lower screen members are individually removable from the post or frame members, but are not slidably mounted therein. Further still, the subject invention contemplates a raised bed utilizing only a single level of plural screen members, e.g., a plurality of lower screen members, each of which is individually slidably removable from its associated frame sections. Further yet, the size of the screens, and their number is a matter of choice. Thus, for example, the screens may be designed to fit a five foot section of garden so that easy access to the bed to facilitate planting and harvesting can be readily accomplished without the gardener having to step into the bed and compress its soil.

Irrespective of the construction of the system 20, it is also contemplated that other devices and assemblies can be incorporated in it or used with it. For example, while not shown, the system may include a trellis system to permit vertical gardening within the screened enclosure. In addition, the system 20 may include irrigation system, e.g., a battery operated and automatic "drip irrigate" system to irrigate the bed. That irrigation system may include a "rain sensor" to interrupt the automatic irrigation cycle if there is a substantial amount of rain. The system may also include an aviary net arranged to be mounted over the bed to keep out birds, squirrels, etc.

Without further elaboration the foregoing will so fully illustrate our invention that others may, by applying current or future knowledge, adopt the same for use under various conditions of service.

What is claimed is:

1. A system for disposition on the ground for growing plants comprising:
    a base configured to be disposed on the ground and having a plurality of interconnected sections forming a hollow enclosure into which a growing medium can be disposed; and
    a screened enclosure mounted on said base encircling said hollow enclosure and comprising a frame and a plurality of screen members, each of said screen members comprising a peripheral frame surrounding a wire mesh panel, said frame comprising a plurality of frame members connected to and extending upward from said base and receiving said screen members, said screen members comprising upper screen members and lower screen members, said upper screen members and said lower screen members being removably mounted on said frame.

2. The system of claim 1 wherein at least one of said upper screen members is in the form of a panel of a first size woven wire mesh and wherein at least one of said lower screen members is in the form of a panel of a second size woven wire mesh, said first size being greater than said second size.

3. The system of claim 1 wherein adjacent frame members define a respective gap therebetween, wherein each of said screen members has an opposed pair of side edges, a top edge and a bottom edge, and wherein each of said frame members comprises a respective track section configured to slidably receive a respective side of a respective one of said screen members therein, whereupon each of said screen members is slidably located within a respective gap.

4. The system of claim 3 wherein said bottom edge of each of said screen members is configured so that is can be slid to a position immediately adjacent said base, and wherein each of said screen members is configured to be individually slid out of their respective track sections to enable each of said screen members to be individually removed from said frame members.

5. The system of claim 3 wherein at least one of said upper screen members is in the form of a panel of a first size woven wire mesh and wherein at least one of said lower screen members is in the form of a panel of a second size woven wire mesh, said first size being greater than said second size.

6. A system for disposition on the ground for growing plants comprising:
    a base configured to be disposed on the ground and having a plurality of interconnected sections forming a hollow enclosure into which a growing medium can be disposed; and
    a screened enclosure mounted on said base encircling said hollow enclosure and comprising a frame and a plurality of screen members, said frame comprising a plurality of frame members connected to and extending upward from said base and receiving said screen members, said screen members comprising upper screen members and lower screen members, said upper screen members and said lower screen members being removably mounted on said frame, wherein a first one of said frame members and a second one of said frame members define a gap therebetween, each of said first and second frame members comprising a respective section arranged to receive a respective side an associated lower screen member, wherein said bottom edge of said associated lower of screen member can be placed in a position immediately adjacent said base, each of said first and second frame members additionally comprising a section arranged to receive a respective side of an associated upper screen member therein, wherein said bottom edge of said associated upper screen member can be placed in a position immediately adjacent said top edge of said associated lower screen member, each of said associated upper and lower screen members being configured to be individually removed from its respective section of its associated frame members to enable each of said screen members to be individually removed from said frame members.

7. The system of claim 6 wherein each of said first and second frame members comprise a first track section arranged to slidably receive a respective side of said lower screen member therein wherein said bottom edge of said lower screen member can be slid to a position immediately adjacent said base, and wherein each of said first and second frame members additionally comprises a second track section arranged to slidably receive a respective side of said upper screen member therein wherein said bottom edge of said upper screen member can be slid to a position immediately adjacent said top edge of said lower screen frame, said lower screen member being arranged to be individually slid out of said first track section of said first and second track members to enable said lower screen member to be individually removed from said screened enclosure, said upper screen member being arranged to be individually slid out of said second track section of said first and second track members to enable said upper screen member to be individually removed from said screened enclosure.

8. The system of claim 7 wherein each of said first and second frame members comprises a lower portion and an upper portion and wherein said first track section is located at said lower portion of said first and second frame members, and wherein said second track section is located at said upper portion of said first and second frame members.

9. The system of claim 8 wherein each of said first and second frame members comprises an outside surface and an oppositely disposed inside surface, with said inside surface being directed towards said hollow enclosure of said base, and wherein said second track section is located adjacent said inside surface and said first track section is located adjacent said outside surface, whereupon when said upper screen member is disposed in said second track sections of said first and second frame members, and said lower screen member is disposed is said first track sections of said first and second frame members, said upper screen member is set back with respect to said lower screen member.

10. The system of claim 6 wherein each of said screen members comprises a peripheral frame surrounding a wire mesh panel.

11. The system of claim 10 wherein at least one of said upper screen members is in the form of a panel of a first size woven wire mesh and wherein at least one of said lower screen members is in the form of a panel of a second size woven wire mesh, said first size being greater than said second size.

12. The system of claim 6 wherein at least one of said upper screen members is in the form of a panel of a first size woven wire mesh and wherein at least one of said lower screen members is in the form of a panel of a second size woven wire mesh, said first size being greater than said second size.

* * * * *